United States Patent Office 2,997,398
Patented Aug. 22, 1961

2,997,398
COATING COMPOSITIONS
Max Kronstein, New York, and Joseph Eichberg, Great Neck, N.Y., assignors, by mesne assignments, to American Lecithin Company, Atlanta, Ga., a corporation of Georgia
No Drawing. Filed July 14, 1958, Ser. No. 748,111
17 Claims. (Cl. 106—14)

The present invention relates to a modification of phosphatides, such as lecithin, for their incorporation and use in coating compositions.

These modifications have the aim to eliminate the characteristics of lecithin which are undesirable in coating compositions, and they have the aim of giving to the lecithin new characteristics such as to improve the behaviour of the resulting coating compositions.

By reacting lecithin with metal compounds, metal derivatives of the lecithin are obtained. These lecithin derivatives differ from lecithin itself in their properties, and they give to the coating compositions new and desirable properties.

For example, cobalt, lead, nickel, manganese, iron, zinc and titanium may be introduced by heating phosphatides or lecithin in the presence of the oil carrier or with the oil carrier largely removed, with the hydroxides, as well as with the acetates, carbonates, chromates, naphthenates or phosphates of the metals whose compounds are to be formed.

The present invention preferably uses the reaction products of lecithin which are obtained from heating together the lecithin with a metal hydroxide. The preferred lecithin compounds with the metals should be free of chloride or sulfate radicals.

The compounds formed which may be referred to as metal phosphatidate or metal lecithinate appear to be combinations in which the metal replaces the hydrogen of hydroxy groups in the phosphatide, as well as forming a salt or soap-like ester product with the lecithin or phosphatide molecule.

Other novel modifications of the phosphatide or lecithin consist of introducing into the lecithin, new chemical groups as well as giving to the novel modified phosphatide or lecithin product additional chemical reactivity and ability to produce new coating effects.

Lecithin is a complex material which has the active groups which permit introduction of new components required for the aims of this invention.

By introducing a phosphoric acid group into the lecithin, the new products are obtained which give to the coating compositions the ability to react with metal surfaces to which they are applied so as to obtain an increased adhesion and corrosion resistance.

These modified phosphatide or lecithin compounds may be used in pigment carrying compositions which can be used as paints, lacquers and varnishes.

These coating compositions in which a phosphorylated lecithin is employed have novel surface reactive qualities and the phosphoric acid group or groups having phosphorizing effect on metal surfaces to which the coating composition is applied.

These phosphatide metal or phosphorylated compounds may be included in various pigment and coating compositions in amounts ranging from about 1% to 6% on the weight of the pigment. The vehicle may consist of any film forming materials, including resins such as alkyd or modified phthalic resins, dissolved in a volatile solvent, such volatile solvents being for example various combinations of aromatic and aliphatic solvents, such as xylol, toluol and benzol combined with butanol, aryl alcohol and other suitable aliphatic solvent combinations with the inclusion of amounts of drying oil such as linseed oil and mineral spirits, depending upon the particular type of liquid coating composition it is desired to produce.

It has been found that these metal derivatives of phosphatides or lecithin compounds reduce the paint thickening qualities, and improve the re-dispersability of any pigments which might have settled out from such paint dispersions upon storage and standing, and may give the paint desirable drying effects which can be regulated by the amount of the metal phosphatide compound included.

To give some specific examples:

EXAMPLE 1.—USE OF METAL LECITHINATES AS PAINT DRIERS

Cobalt, lead or manganese lecithin compounds are prepared by heating oil-free soybean lecithin or a combination of ⅔ commercial soybean lecithin and ⅓ soybean oil for 1 to 4 hours at 70° C. with the hydroxides, acetates or carbonates of cobalt or lead or manganese. A similar zinc product may be prepared by utilizing zinc hydroxide. The resultant metal lecithin compounds may be dispersed in organic vehicles or in pigment vehicle mixtures.

In this example the metal derivatives of the lecithin are used in drier systems.

A 50% of a drying phthalic resin material or a drying oil alkyd resin of the short oil type (41% soybean oil with 42% phthalic anhydride) was used. Drying tests were made in accordance to the Federal Specification TT–P–I4Ib, Method 406.1 and 2.

As a drier metal 0.48 part of lead was introduced into 100 parts by using 2 parts of a lead naphthenate (24% lead) or by using 4.57 parts of a lead derivative of lecithin (10.5% lead), or 0.03 part cobalt was introduced either in form of 0.5 part cobalt naphthenate (6% cobalt) or in form of 0.71 part of a cobalt salt derivative of lecithin (4.2% cobalt).

The following comparative tests were made using lead and cobalt both in form of their naphthenates, or using one of them as naphthenate; the other one was a lead or cobalt lecithin compound. The drying items were as follows:

Table 1

| | Dust Free | | Tack free, hours | After Tack, hours | Dry Through, hours | Full Hard, hours |
|---|---|---|---|---|---|---|
| | min. | sec. | | | | |
| Resin alone | 4 | | 7×24 | 8×24 | 10 or 11×24 | 11×24 |
| With lead and cobalt as naphthenates. | 3 | | 5 to 6 | 6.5 | 7.5 | 22 |
| With lead as naphthenate and cobalt as lecithin derivative. | 3 | | 5 to 6 | 6.5 | 7.5 | 22 |
| With lead as lecithin derivative and cobalt as naphthenate. | 3 | 30 | 5.5 to 6 | 6.5 | 7.5 | 2? |

EXAMPLE 2.—USE OF METAL LECITHINATES TO REMOVE TACKINESS

The same resin material was used as in Example 1. The following tests were made:

*Table 2*

| 100 part totals | Dust Free | | Tack Free, days | After Tack, days | Dry Through, days | Full Hard, days |
|---|---|---|---|---|---|---|
| | min. | sec. | | | | |
| Resin with: | | | | | | |
| 0.48 part lead and 0.03 part cobalt as naphthenates | 5 | | 0.33 | 1.5 | 2 | 3-3.5 |
| 0.315 part lead and 0.021 part cobalt as lecithin derivatives | 5 | | 2 | 2-3 | 3-3.5 | 6 |
| 0.48 part lead and 0.006 part manganese as naphthenates | 4 | 30 | 1.5 | 2 | 3 | 4-5 |
| 0.316 part lead and 0.0217 part manganese as lecithin derivatives | 4 | 15 | 4-5 | 5-6 | 6 | 7 |

It is evident from Examples 1 and 2 that the metal ions are active in the metal lecithinates and that their action is thus the reverse of that of ordinary commercial lecithin which, it is known, tends to delay the drying.

EXAMPLE 3.—USE OF METAL LECITHINATES TO ENHANCE VEHICLE STABILITY

A paint was prepared containing a pigmentation of 190 parts ferric oxide, 35 parts zinc oxide, 35 parts zinc chromate and 83 parts magnesium silicate. The organic vehicle was prepared by dissolving 127 parts of a modified phthalic resin or alkyd resin in 183 parts of a volatile solvent, then 6.8 parts of ordinary commercial soybean lecithin were added and about 2.75 parts of naphthenate driers and the paint ball-milled for 16 hours.

Samples of the identical paint were prepared in which the ordinary lecithin was replaced by 6.8 parts of cobalt lecithinate (11.6% cobalt).

The sample with ordinary commercial lecithin showed gelling after long storage. The supernatant fluid of the sample with cobalt lecithinate had a lower viscosity, yet showed a lower light transmission than the control.

*Table 3.—Light transmission readings using the Photovolt colorimeter*

| Lecithin | Viscosity, cps. | Transmission | | | |
|---|---|---|---|---|---|
| | | Standard I | | Standard II | |
| | | Before | After | Before | After |
| None | 120 | 38.2 | 84.2 | 25.9 | 39.4 |
| Soybean Lecithin | 120 | 44.4 | gelled | 25.5 | gelled |
| Cobalt Lecithinate, 11.6% Co | 130 | 8.3 | 36.7 | 7.0 | 22.5 |

The cobalt lecithinate did not gel even though it has drying properties when paint is applied as a film, in contrast to the ordinary commercial lecithin.

EXAMPLE 4.—USE OF METAL LECITHINATES AS AFFECTING PIGMENT WETTING

Using the paint formulation of Example 3 and ordinary common soybean lecithin the cobalt lecithinate containing 7.5% cobalt, it was demonstrated by pour tests that the metal lecithinate is a more effective wetting and dispersing agent. The pour test is carried out at given time intervals and at each time interval one test tube of each paint is clamped into a holder and turned to an angle of 45° with its open end fixed above the opening of an identical empty tube clamped into vertical position.

The amount of paint which does not flow out in 1 minute, 2 minutes and 5 minutes in the 45° position is determined by weighing and calculated as percent of total paint. The tests are made at the start of the settling test, after 1 week, 2 weeks, 26 days and 37 days. The temperature during the tests is 25° C. ± 1°. The following are an expression for the increased flowout of the total paint material during the test periods.

In the examples, sample C has no lecithin, sample D has ordinary commercial soybean lecithin and sample E has cobalt lecithinate included therein.

*Table 4.—Percent remaining in test tubes after settling*

| Pouring Time, Days | 0 | 7 | 11 | 14 | 25 | 32 | 37 |
|---|---|---|---|---|---|---|---|
| Sample C: | | | | | | | |
| 1 minute | 2.4 | 12 | | 22 | 33 | | 41 |
| after 2 min | 2.0 | 9 | | 18 | 28 | | 37 |
| after 5 min | 1.4 | 6 | | 15 | 25 | | 34 |
| Sample D: | | | | | | | |
| 1 minute | 1.5 | 9 | | 14 | 24 | | 32 |
| after 2 min | 0.61 | 6 | | 10 | 19 | | 28 |
| after 5 min | 0.24 | 4 | | 7 | 12 | | 23 |
| Sample E: | | | | | | | |
| 1 minute | 3.1 | | 6.6 | | 11.7 | 13.4 | 17.5 |
| after 2 min | 2.3 | | 5.3 | | 8.0 | 9.95 | 12.7 |
| after 5 min | 1.7 | | 4.0 | | 6.0 | 6.7 | 9.7 |

The metal lecithinate offers advantages over ordinary commercial soybean lecithin with respect to stability and effect on drying of films.

It would have been expected that the phosphatide combined with the metal would have lost its peculiar colloidal pigment wetting and dispersing efficiency. However, the metal lecithinate exhibits superior wetting and dispersing action.

EXAMPLE 5.—USE OF METAL LECITHINATES TO MINIMIZE DARKENING

A zinc soybean lecithinate product made from commercial soybean lecithin was combined with linseed oil in the amount of 100 parts of the oil with 0.68 part of the zinc lecithin complex. It was found that this resulting oil when pigmented was quite resistant against darkening and had a lighter color even when baked as compared with the same mixture containing ordinary commercial vegetable lecithin.

EXAMPLE 6.—USE OF METAL LECITHINATES FOR GLOSS CONTROL

A white baking enamel was obtained by combining 300 parts of titanium oxide, 512 parts of a 50% solution of a modified phthalic resin, and 223 parts of a 50% solution of urea formaldehyde resin dissolved in a combination of xylol and butanol.

This paint composition was further diluted with 30 parts of mineral spirits and there was added thereto about 20 parts of a zinc lecithinate (containing 5% zinc). Upon air drying, the paint which was produced showed a higher reflection and the produced product upon baking was substantially devoid of yellowing and had a much lighter color, as compared with the same paint composition made with 20 parts of ordinary commercial soybean lecithin. Further, one of the undesired effects of ordinary commercial lecithin is a loss of gloss in baking enamels. This loss is reduced by the metal lecithinate as shown by the following results obtained with the above formulation:

resin were milled into a paint with 1200 parts of iron oxide. The resulting paint was divided into six parts.

Table 6.—Effect on gloss

PAINT FILM APPLIED ON 1010 STEEL WITH 6 MIL BIRD GAGE MEASURED WITH THE PHOTOVOLT GLOSS METER AGAINST BLACK CARRARAGLASS STANDARD

|  | Airdried 18 hrs | 15 min. | Percent loss | 1 hr. | Percent loss | 2 hrs. | Percent loss | 3 hrs. | Percent loss | 4 hrs. | Percent loss |
|---|---|---|---|---|---|---|---|---|---|---|---|
| Control | 87.3 | 85.1 | 2.52 | 75.4 | 13.6 | 62.8 | 28.1 | 60.2 | 31.0 | 55.4 | 36.6 |
| Commercial soybean lecithin | 85.9 | 85.2 | 0.82 | 70.0 | 18.5 | 59.2 | 31.2 | 44.1 | 48.6 | 37.9 | 56.0 |
| Zinc lecithinate | 87.0 | 85.1 | 2.18 | 72.8 | 16.3 | 54.9 | 36.8 | 49.8 | 42.6 | 40.2 | 53.7 |

EXAMPLE 7.—USE OF METAL LECITHINATES WITH REACTIVE PIGMENTS

Three samples were made using (1) boiled linseed oil without lecithin, (2) boiled linseed oil with ordinary commercial soybean lecithin, and (3) boiled linseed oil with zinc salt reaction product of commercial lecithin (containing about 8% zinc).

Each of the three oils was combined with red lead, using 65 parts of red lead for each 22 parts of linseed oil. Where soybean lecithin product was added, 5 parts were used.

The mixture was diluted with 19 parts of mineral spirits poured into 8" test tubes and allowed to stand for 4 days. The tubes without stirring were then held at 150° F. for 4 hours in order to accelerate the interreaction.

The tubes were then allowed to cool and the transmission of the supernatant liquid was measured. The zinc salt derivative of lecithin in linseed oil produces an oil which is lighter in color and higher in transmission than the lecithin itself in linseed oil.

Table 7

These were the transmission values:

|  | Before (Solutions Without Lead) | Exposed at 150° F. |
|---|---|---|
|  | Percent | Percent |
| Linseed oil before reaction with red lead—used as standard | 100 | 100 |
| Linseed oil after reaction with red lead |  | 35.6 |
| Linseed oil with soybean lecithin after reaction with red lead | 63.5 | 11.8 |
| Linseed oil with zinc salt derivative of lecithin after reaction with red lead | 70.2 | 18.1 |

The metal lecithinate is shown, unexpectedly, to exhibit more activity than the unreacted lecithin material.

EXAMPLE 8.—USE OF METAL LECITHINATES FOR MOLD CONTROL 36 parts of a 50% solution oil modified alkyd or glyptal Part I was used without lecithin, part II with 4 parts soybean lecithin, part III with 4 parts of a cobalt salt-lecithin (5.8% cobalt), part IV with 4 parts of a zinc salt-lecithin derivative (7% zinc), part V with 4 parts of a mercury salt-lecithin derivative (3% mercury) and part VI with 4 parts of a copper salt-lecithin derivative (3% copper).

The paints were used in open trays and were exposed in a closed oven, which was maintained at 27° C. with a high moisture level suitable for the growth of fungi.

A culture of Aspergillus niger was introduced into each sample.

The growth of the mold started slowly. After 10 days the samples I and II showed much white growth, the samples III and IV showed less growth, and the samples V and VI showed no growth at all.

After 13 days the first four samples showed progressive growth, the sample with the mercury salt-lecithin derivative showed no growth at all and the copper salt-lecithin product showed very little local growth.

After 24 days the samples II and II were covered by the growth all over the surface, sample III over 3/4 of the surface, sample IV over 2/3 of the surface, sample V over 1/10 of the surface and sample VI 3/10 of the surface.

The lecithin-mercury and lecithin-copper are, therefore, very useful in mold protection.

EXAMPLE 9.—USE OF METAL LECITHINATES PROMOTES ANTI-SKINNING AND IMPROVES WETTING

In combinations of metal lecithinates and commercial soybean lecithin it is found that when half filled containers are allowed to stand for some time the metal lecithinates exhibit anti-skinning properties and contrary to metal naphthenates exhibit very marked pigment wetting effects as evidenced by sedimentation and by the light transmission of the supernatant fluid. The test results presented in the following tables were obtained on a paint formulated with alkyd resin (50% solids) accounting for 58.4% of the paint, toluene as diluent amounting to 33.4% of the paint and the pigment (Sun Yellow C) amounting to 8.2% of the paint:

Table 9A.—Formulation of the test paints

|  | Paint #1 | Paint #2 | Paint #3 | Paint #4 | Paint #5 | Paint #6 |
|---|---|---|---|---|---|---|
| Resin (50%) | 66.9 | 67.2 | 67.4 | 67.6 | 62.4 | 59.4 |
| Pigment and Vehicle | 114.6 | 115.0 | 115.4 | 115.8 | 106.85 | 101.75 |
| Cobalt Soln. (Naphth. soln. 6% Co) (Lecith. soln. 4.2% Co) | 0.34 (Naphth.) | 0.34 (Naphth.) | 0.35 (Naphth.) | 0.36 (Naphth.) | 0.46 (Lecith.) | 0.43 (Lecith.) |
| Lead Solution (Naphth. soln. 24% Pb) (Lecith. soln. 10.5% Pb) | 1.35 (Naphth.) | 1.36 (Naphth.) | 3.10 (Lecith.) | 3.11 (Lecith.) | 1.26 (Naphth.) | 1.19 (Naphth.) |
| Soybean Lecithin |  | 3.5 |  | 3.6 |  | 3.1 |

Table 9B.—Sedimentation after one week's storage (a) Visual observation (after 1 week):

| Paint #1 | Paint #2 | Paint #3 | Paint #4 | Paint #5 | Paint #6 |
|---|---|---|---|---|---|
| No visible sedimentation. | Sediment, but supernatant liquid cloudy. | Sedimentation. Top liquid slightly cloudy. | Sedimentation. Top liquid slightly cloudy. | Slight sedimentation but thickened. | Complete sedimentation. |

Table 9C (b) Transmission readings (made with Lumetron colorimeter):

| Paint #1 | Paint #2 | Paint #3 | Paint #4 | Paint #5 | Paint #6 |
|---|---|---|---|---|---|
| Percent ------- | Percent 20.1 | Percent 31.0 | Percent 72 | Percent ------ | Percent 100 |

EXAMPLE 10.—PHOSPHORYLATED LECITHIN 100 parts commercial soybean lecithin was reacted with 4 parts 40% peracetic acid at 20° to 50° C. and 10 parts powdered $P_2O_5$ added and maintained at 10° to 30° C. Surplus free acid may be neutralized with an alkali such as sodium hydroxide or diisopropyl amine.

1 part of the reaction product was dissolved in 6 parts of toluol. 1010 steel panels were immersed for 180 minutes. Then the panels were washed off with a solvent and the panels were dried.

The surface of the panels showed the formation of a substantial inorganic coating, similar to that produced in the process of phosphatizing spray coatings with water solutions of phosphates. To compare the appearance of the initial not coated steel with the treated surfaces, their surface reflectance was measured. The instrument was set to measure the surface reflectance of the untreated steel as 50%. Two steel surfaces immersed in the solvent solution of the phosphorylated lecithin showed a decrease in reflectance to 35.8% and to 37% due to the produced coating effect.

Such phosphorylated lecithins can also be incorporated into organic vehicles and into paint materials to increase the surface reactivity of the coating materials to the coated surface. This can be utilized for instance in the case of so-called primer paints. They appear to give iron and steel surfaces a rust resistant surfacing.

It should be noted that the combination of commercial soybean lecithin and metal lecithinate is much more effective for wetting than where the commercial soybean lecithin is used with the metal naphthenates.

Having now particularly described and ascertained the nature of the invention, and in what manner the same is to be performed,

What is claimed is:

1. A process of enhancing coating compositions consisting essentially of pigment and a drying vehicle which comprises adding thereto 1 to 6% of metal phosphatidate, said percentage being based upon the weight of the pigment and said metal being selected from a group consisting of cobalt, lead, manganese, zinc, mercury and copper and titanium.

2. A process of enhancing coating compositions consisting essentially of pigment and a drying vehicle which comprises adding thereto 1 to 6% of metal lecithinate, said percentage being based upon the weight of the pigment and said metal being selected from a group consisting of cobalt, lead, manganese, zinc, mercury and copper and titanium.

3. A coating composition consisting essentially of 1 to 6% of phosphorylated phosphatide based upon the weight of the pigment.

4. A coating composition consisting essentially of 1% to 6% metal derivative of phosphatide, said percentage being based upon the weight of the pigment and said metal being selected from a group consisting of cobalt, lead, manganese, zinc, mercury and copper and titanium.

5. A linseed oil paint composition consisting essentially of red lead and 1 to 6% of a metal phosphatidate, said percentage being based upon the weight of the pigment and said metal being selected from a group consisting of cobalt, lead, manganese, zinc, mercury and copper and titanium.

6. A coating composition consisting essentially of 1 to 6% of a metal phosphatidate selected from the group consisting of cobalt, lead, manganese, zinc, mercury, copper and titanium phosphatidates, said percentage being based upon the weight of the pigment and said metal being selected from a group consisting of cobalt, lead, manganese, zinc, mercury and copper and titanium.

7. A oleo-resinous paint composition consisting essentially of a naphthenate and 1 to 6% of a metal phosphatidate selected from the group consisting of cobalt, lead, manganese, zinc, mercury, copper and titanium phosphatidates based upon the weight of the pigment.

8. A liquid coating composition consisting of a vehicle including film forming resin materials dissolved in organic volatile aromatic and aliphatic solvents and containing 1 to 6% of a metal phosphatidate, said percentage being based upon the weight of the pigment and said metal being selected from a group consisting of cobalt, lead, manganese, zinc, mercury and copper and titanium.

9. A paint composition consisting of 127 parts of an alkyd resin dissolved in 183 parts of a volatile organic solvent containing 6.8 parts of cobalt lecithin and 2.75 parts of a naphthenate drier which is highly stable and does not gel and has low viscosity and low light transmission.

10. A white baking enamel consisting essentially of 300 parts titanium oxide, 512 parts of a 50% solution of a modified phthalic resin, and 223 parts of a 50% solution of urea formaldehyde resin dissolved in a combination of xylol and butanol diluted with 30 parts of mineral spirits also containing 20 parts of a zinc lecithinate (containing 5% zinc), said enamel showing a higher reflection upon air drying and being devoid of yellowing upon baking.

11. A liquid coating composition consisting essentially of boiled linseed oil with zinc salt reaction product of commercial lecithin (containing about 8% zinc) combined with red lead, using 65 parts of red lead for each 22 parts of linseed oil diluted with 19 parts of mineral spirits, said oil being lighter in color and high in light transmission.

12. A paint composition consisting essentially of 36 parts of a 50% solution oil of a glyptal resin milled into a paint with 1200 parts of iron oxide and also containing 4 parts of a cobalt salt-lecithin (5.8% cobalt), said composition being mold resistant.

13. A paint composition consisting essentially of 100 parts of phosphorylated soy bean lecithin dissolved in 600 parts of toluol, having rust resistant properties when used as a coating on metal panels.

14. A paint drier consisting essentially of a metal lecithinate selected from the group consisting of cobalt, lead, manganese, mercury, copper, titanium and zinc lecithinate.

15. A paint consisting essentially of a vehicle including film forming resin materials dissolved in organic aromatic and aliphatic solvents with drying oils and mineral spirits and a pigment and containing 1 to 6% of a paint drier of claim 14 based on the weight of the pigment.

16. A paint containing 1 to 6% of a paint drier of claim 14 based on the weight of the pigment and also containing 50% of a drying phthalic resin.

17. A method of preparing a paint drier which comprises heating soya bean lecithin for 1 to 4 hours at 70° C. with a metal compound selected from the group consisting of cobalt, lead, manganese, mercury, copper, titanium, and zinc hydroxides, acetates, and carbonates and combining them with a napthenate of one of said metals.

References Cited in the file of this patent

UNITED STATES PATENTS

| | | |
|---|---|---|
| 2,201,064 | Thurman | May 14, 1940 |
| 2,271,409 | Thurman | Jan. 27, 1942 |
| 2,465,733 | Levis | Mar. 29, 1949 |
| 2,839,545 | Hennessy | June 17, 1958 |
| 2,839,546 | Davis | June 17, 1958 |